(12) United States Patent
Enning

(10) Patent No.: US 11,225,151 B2
(45) Date of Patent: Jan. 18, 2022

(54) MOTOR VEHICLE AND METHOD FOR ARRANGING AT LEAST ONE TRACTION ENERGY STORAGE DEVICE IN A MOTOR VEHICLE

(71) Applicant: AUDI AG, Ingolstadt (DE)

(72) Inventor: Norbert Enning, Denkendorf (DE)

(73) Assignee: AUDI AG, Ingolstadt (DE)

( * ) Notice: Subject to any disclaimer, the term of this patent is extended or adjusted under 35 U.S.C. 154(b) by 116 days.

(21) Appl. No.: 16/628,425

(22) PCT Filed: Jun. 25, 2018

(86) PCT No.: PCT/EP2018/066909
§ 371 (c)(1),
(2) Date: Jan. 3, 2020

(87) PCT Pub. No.: WO2019/007730
PCT Pub. Date: Jan. 10, 2019

(65) Prior Publication Data
US 2020/0223302 A1    Jul. 16, 2020

(30) Foreign Application Priority Data

Jul. 4, 2017  (DE) .................. 10 2017 211 364.2

(51) Int. Cl.
*B60K 1/04* (2019.01)
*B60L 50/64* (2019.01)
(Continued)

(52) U.S. Cl.
CPC .............. *B60L 50/64* (2019.02); *B60K 1/04* (2013.01); *B60L 50/66* (2019.02); *B60L 53/12* (2019.02);
(Continued)

(58) Field of Classification Search
CPC .......... B60L 50/64; B60L 50/66; B60L 53/80; B60K 2001/0411; B60K 2001/0483
See application file for complete search history.

(56) References Cited

U.S. PATENT DOCUMENTS 5,301,765 A * 4/1994 Swanson ................... B60L 8/00
                                                        180/68.5
9,358,895 B2 * 6/2016 Avganim ................ B60L 50/66
(Continued)

FOREIGN PATENT DOCUMENTS

CN      202 448 723 U    9/2012
DE        44 22 005 A1   12/1995
(Continued)

OTHER PUBLICATIONS

Examination Report dated Feb. 26, 2018 in corresponding German application No. 10 2017 211 364.2; 12 pages including Machine-generated English-language translation.
(Continued)

*Primary Examiner* — Brian L Swenson
(74) *Attorney, Agent, or Firm* — Maier & Maier, PLLC

(57) ABSTRACT

A motor vehicle with two front wheels and two rear wheels and with an electric drive that is operable via a traction energy storage device. The motor vehicle has a front recess in the region between the front wheels for a traction energy storage device assigned to the front recess, and has a rear recess in the region between the front wheels and the rear wheels, arranged in an underbody of the motor vehicle, for a traction energy storage device assigned to the rear recess, and traction energy storage devices are insertable or inserted into the recesses.

8 Claims, 3 Drawing Sheets

(51) Int. Cl.
  *B60L 53/12* (2019.01)
  *B60L 53/80* (2019.01)
  *B60L 50/60* (2019.01)
  *B60L 53/16* (2019.01)
  *B60L 58/26* (2019.01)
  *B60L 1/00* (2006.01)
  *B60L 1/02* (2006.01)

(52) U.S. Cl.
  CPC ............ *B60L 53/16* (2019.02); *B60L 53/80* (2019.02); *B60K 2001/0411* (2013.01); *B60K 2001/0438* (2013.01); *B60L 1/003* (2013.01); *B60L 1/02* (2013.01); *B60L 58/26* (2019.02)

(56) References Cited

U.S. PATENT DOCUMENTS

| | | | | |
|---|---|---|---|---|
| 9,643,656 | B1* | 5/2017 | Hall | B60K 15/07 |
| 10,217,160 | B2* | 2/2019 | Penilla | B60L 53/11 |
| 10,910,614 | B2* | 2/2021 | Ortmann | H01M 10/4207 |
| 2010/0292877 | A1* | 11/2010 | Lee | B60L 53/80 |
| | | | | 701/21 |
| 2011/0174561 | A1 | 7/2011 | Bowman | |
| 2012/0018238 | A1* | 1/2012 | Mizoguchi | H01M 10/625 |
| | | | | 180/68.5 |
| 2012/0125702 | A1 | 5/2012 | Bergfjord | |
| 2014/0193683 | A1* | 7/2014 | Mardall | H01M 10/625 |
| | | | | 429/99 |
| 2015/0165900 | A1 | 6/2015 | Gagnon | |
| 2017/0259676 | A1* | 9/2017 | Goss | B60L 53/18 |
| 2020/0384841 | A1* | 12/2020 | Hirsch | B62D 21/15 |

FOREIGN PATENT DOCUMENTS

| | | |
|---|---|---|
| DE | 10 2010 018 725 A1 | 11/2011 |
| DE | 20 2013 104 224 U1 | 10/2013 |
| DE | 10 2012 106 514 A1 | 3/2014 |
| DE | 10 2013 207 535 A1 | 10/2014 |
| DE | 10 2014 001 289 B3 | 5/2015 |
| DE | 20 2014 008 336 U1 | 1/2016 |
| EP | 2072309 A1 | 6/2009 |
| EP | 2 497 677 A2 | 9/2012 |
| FR | 2 954 233 A1 | 6/2011 |
| WO | 2015/056598 A1 | 4/2015 |
| WO | 2015/138194 A1 | 9/2015 |
| WO | 2016/088476 A1 | 6/2016 |

OTHER PUBLICATIONS

International Search Report and Written Opinion of the International Searching Authority dated Sep. 6, 2018 in corresponding International application No. PCT/EP2018/066909; 30 pages including Machine-generated English-language translation.

International Preliminary Report on Patentability dated Oct. 18, 2019 in corresponding International application No. PCT/EP2018/066909; 38 pages.

* cited by examiner

MOTOR VEHICLE AND METHOD FOR ARRANGING AT LEAST ONE TRACTION ENERGY STORAGE DEVICE IN A MOTOR VEHICLE

FIELD

The invention relates to a motor vehicle with two front wheels and two rear wheels as well as an electric drive which is operable via a traction energy storage device. Furthermore, the invention relates to a method for arranging at least one traction energy storage device in a motor vehicle.

BACKGROUND

In vehicles with an electric drive, the capacity of the energy storage devices installed in the vehicle has a significant influence on the maximum possible range of the vehicle in electric operation, on the average engine power that may be called up for a given range, and on the production costs of the motor vehicle. It is therefore of interest to be able to produce different construction variants of motor vehicles in the simplest possible manner that are adaptable with regard to the capacity of their energy storage device.

US 2011/0174561 A1 describes a hybrid drive system for a truck suitable for transporting dangerous goods. The hybrid drive system comprises two batteries arranged on the sides of the truck. An electric motor and electronics necessary for operating the electric motor are housed between the batteries in the middle of the vehicle.

DE 10 2013 207 535 A1 describes a pole connecting plate for a battery, through which two opposite poles of two battery cells arranged next to one another may be connected. Furthermore, the pole connecting plate comprises a sensor fastening device, in which, for example, a temperature sensor may be received. The battery cells connected via pole connecting plates may be arranged in a housing to form an energy storage device.

EP 2 497 677 A2 describes an electric motor vehicle with an energy storage device that may be charged by an external energy source. In addition to a battery, the electric vehicle comprises several electrical components and several relays, whose circuitry makes it possible to reduce the load on the electronic components during charging processes.

The objective of the invention is to provide a motor vehicle that is adaptable in view of its energy storage capacity.

SUMMARY

To achieve this objective, the invention provides that the motor vehicle has a front recess in the region between the front wheels for a traction energy storage device assigned to the front recess, and has a rear recess in the region between the front wheels and the rear wheels, arranged in an underbody of the motor vehicle, for a traction energy storage device assigned to the rear recess, wherein traction energy storage devices are insertable or inserted into the recesses.

The advantage of the solution according to the invention is that the number of traction energy storage devices used in the motor vehicle may be adapted in a model-specific or equipment-specific manner. For example, standardized traction energy storage devices may be used in different models or equipment variants, respectively assigned to the front recess or the rear recess. The traction energy storage devices assigned to one of the recesses may in particular be available with different capacities, resulting in a modular system comprising several different traction energy storage devices, by way of which the motor vehicle may be adapted to a desired storage capacity. One or more traction energy storage devices that individually or jointly have the desired capacity may be selected from the traction energy storage.

Preferably, all traction energy storage devices of a motor vehicle have the same nominal voltage and are connected in parallel in order to increase the capacitance available at the nominal voltage. Arrangements of capacitors or batteries or accumulators may be used as traction energy storage devices.

For example, the front recess arranged between the front wheels may be arranged above or next to the front axle of the motor vehicle. The rear recess, arranged in the region between the front wheels and the rear wheels or in the region between a front axle and a rear axle of the motor vehicle, may be arranged in an underbody of the motor vehicle, wherein the term "underbody" describes a region of the motor vehicle located under a passenger compartment of the motor vehicle.

A preferred embodiment of the invention provides that the motor vehicle has at least one middle recess in the region between the front recess and the rear recess, arranged in the underbody of the motor vehicle, for a traction energy storage device assigned to the middle recess, wherein a traction energy storage device is insertable or inserted into the middle recess. Providing one or more middle recesses for inserting a traction energy storage device assigned to each recess expands the construction set to a total of three or more possible positions for the introduction of traction energy storage devices. This allows creating more models or equipment variants as well as achieving a more equal distribution of the weight of the traction energy storage devices in the motor vehicle.

According to the invention, the motor vehicle in the region between the front recess and the rear recess may have further components that may be electrically connected to one or more traction energy storage devices of the motor vehicle. The components may be electrically connected or interconnected in accordance with their respective function and may be electrically connected to one or more traction energy storage devices of the motor vehicle. In a motor vehicle that has at least one traction energy store inserted into a middle recess, the components may be located, for example, above or next to the at least one traction energy storage device.

As for the arrangement of the components, it may be furthermore provided for them to be arranged in a transmission tunnel and/or in the underbody of the motor vehicle. An arrangement of components and of connector means electrically connecting the components may be parallel or serial in the driving direction of the vehicle in the transmission tunnel, for example, or in the underbody.

According to the invention, the components may include at least one charger and/or at least one device for contactless energy transmission and/or at least one DC voltage converter and/or at least one electric heater and/or at least one air conditioning compressor. The charger may be used, for example, to charge the at least one traction energy storage device of the motor vehicle via the connection to an external power network. In addition or as an alternative, a device for contactless energy transmission may be provided, by means of which the traction energy store device(s) may be charged in a contactless energy transmission process, for example in an inductive method. The components may include a DC voltage converter, designed, for example, to generate a low voltage for an on-board electrical system of the motor vehicle from a high voltage of the traction energy storage device. An electric heater may, for example, heat the passenger compartment, and an air conditioning compressor may cool the passenger compartment. By means of an appropriate electrical connection or interconnection of the respective components to the at least one traction energy storage device, depending on the function of the components, the energy storage device may be charged or the component may be operated by energy stored in the traction energy storage device.

According to the invention, the electric drive of the motor vehicle may comprise at least one electric machine arranged in the region of the rear wheels and/or at least one electric machine arranged in the region of the front wheels. Only one or two electric machines may be provided between the respective wheel pairs; alternatively, four wheel hub motors are conceivable. The one or more electric machines may be used to propel the vehicle in motor operation, wherein the energy required for this is to be taken from the traction energy storage device(s) of the motor vehicle. When braking the motor vehicle, the one or more electric machines may be used, for example, in generator operation to charge the traction energy storage device. The number of traction energy storage devices installed in the motor vehicle or the total capacity of the traction energy storage devices installed in the motor vehicle may, for example, be a function of a nominal power of the electric machine or of a total nominal power of the electric machines.

In order to connect the motor vehicle to a charging device, the motor vehicle may be provided according to the invention with at least one charging socket arranged in an area above one of the rear wheels. It is also possible for the motor vehicle to have more than one charging socket, wherein, if there are two charging sockets, for example it is preferable for one charging socket to be arranged above one of the two respective rear wheels. In case of more charging sockets, they may be charged via different power networks, for example a 230 V power network or a fast charging system for traction energy storage devices.

In a preferred embodiment of the invention, a traction energy storage device may be provided to be inserted into the front recess, the device being embodied as a removable or replaceable energy storage device, in particular after opening a front cover of the vehicle. Because the traction energy storage device is located in the front recess, it may be removed after opening a front cover of the vehicle, such as a hood. This enables, for example, the exchanging of an empty traction energy storage device for a full one or the replacement of a defective traction energy storage device.

A method for arranging at least one traction energy storage device in a motor vehicle according to the invention comprises the following steps:
  providing the underbody, the at least one traction energy storage device, a frame, the electric connector means, and/or the coolant lines,
  arranging the at least one traction energy storage device on the frame,
  connecting the traction energy storage device with the electric connector means and/or the coolant lines,
  arranging the frame on the underbody.

The at least one traction energy storage device arranged on the frame may be prewired with the electric connector means and/or the coolant lines, which simplifies the assembly process of a motor vehicle according to the invention. After arranging the frame on the underbody, the traction energy storage device may be connected, for example, with its assigned recess, after which the frame may be removed again. As an alternative, it is also possible for the frame to remain in its assigned recess in the motor vehicle after the traction energy storage device has been attached. In this way, in particular, a plurality of traction energy storage devices can be introduced in a plurality of recesses of the motor vehicle each assigned to them, reducing a wiring effort of the traction energy storage device due to the already connected electric connector means and/or the coolant lines. The traction energy storage devices may for example be connected with each other via the electric connector means and/or be connected with further components of the motor vehicle. For example, a traction energy storage device may be connected via the coolant lines to a coolant circuit of the motor vehicle, in order to allow cooling the traction energy storage device in operation.

Furthermore, a method according to the invention may provide components connectable with the at least one traction energy storage device which may be arranged on the frame and that are connected with the traction energy storage device via the electric connector means. This allows for a prewiring of the at least one traction energy storage device with the components outside the motor vehicle, so that the already connected components and the traction energy storage device can be arranged in the connected state in the motor vehicle. In particular, a traction energy storage device inserted into the rear recess and/or one or more traction energy storage device that are inserted into a middle recess may be arranged together with the components in the underbody of the motor vehicle or affixed to it.

In addition thereto, at least one charging socket may be provided according to the invention, which is connected via electric connector means with at least one component and/or the at least one traction energy storage device. The at least one charging socket is already connected in the this way with the components or the traction energy storage device outside the underbody, and then arranged with the component and the at least one traction energy storage device on the underbody. The charging socket itself does not have to be affixed to the underbody to enable a subsequent arrangement of the charging socket in a region above the rear wheels of the motor vehicle.

In a preferred embodiment of the method, at least one electric machine may be provided, which is arranged on the frame and connected with the at least one traction energy storage device via the electric connector means and/or connected to coolant lines. All components of the electric drive of the motor vehicle can thus be arranged on the frame and connected or interconnected with electric connector means, as a result of which subsequent cabling of the electric drive can be dispensed with. The electric machine can additionally be connected to at least one coolant circuit of the motor vehicle via coolant lines, as a result of which cooling of the electric machine is made possible during the operation of the motor vehicle.

BRIEF DESCRIPTION OF THE DRAWINGS

Further advantages and details of the invention arise from the exemplary embodiments described below and from the drawings, which show.

DETAILED DESCRIPTION

Figure 1:
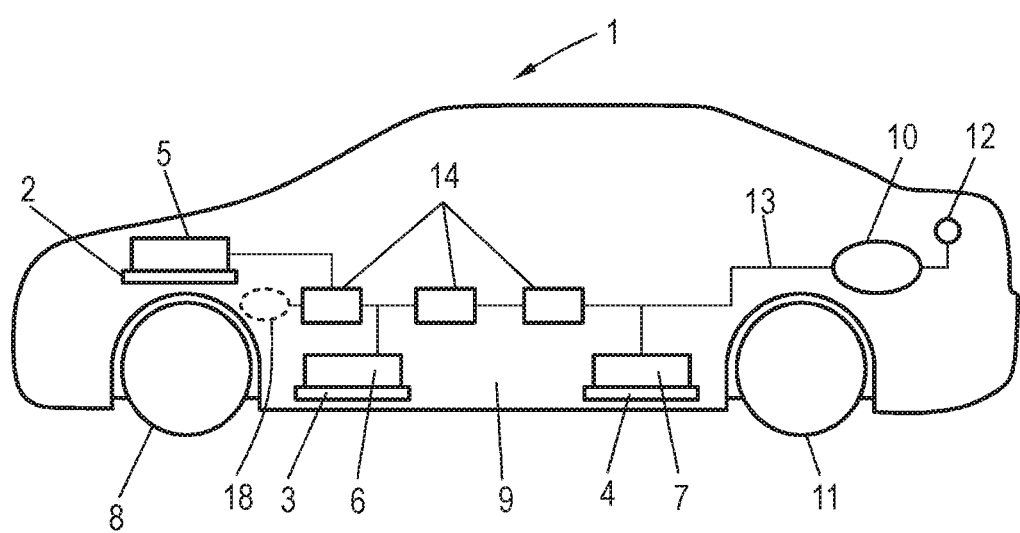
FIG. 1 a schematic side view of a motor vehicle according to the invention.

FIG. 1 shows a schematic side view of a motor vehicle 1 according to the invention. The motor vehicle 1 comprises a front recess 2, a middle recess 3 as well as a rear recess 4. In the front recess 2, a traction energy storage device 5 assigned to the front recess 2 is inserted, in the middle recess 3, a traction energy storage device 6 assigned to the middle recess 3 is inserted, and in the rear recess 4, a traction energy storage device 7 assigned to the rear recess 4 is inserted. The front recess (2) is located in the region between the front wheels 8 of the motor vehicle. The middle recess 3 as well as the rear recess 4 are arranged in an underbody 9 of the motor vehicle 1. The recesses 2, 3, 4 may be embodied for example as recesses or as frames, in which one of the traction energy storage device 5, 6, 7 assigned to the respective recesses 2, 3, 4 may be inserted. The recesses 2, 3, 4 may have fasteners, on which the traction energy storage devices 5, 6, 7 may be affixed, for example by bolting.

In addition thereto, the motor vehicle 1 comprises an electric machine 10, which is arranged in the region between the rear wheel 11 as well as the opposite rear wheel not shown. In addition or as an alternative to the electric machine 11, the motor vehicle 1 may also comprise an electric machine 18 (here shown as a dotted line), which is arranged in the region between the front wheels 8, for example below or next to the front recess 2. Furthermore, in the region above the rear wheel 11, a charging socket 12 is arranged, which is connected via electric connector means 13 with the traction energy storage devices 5, 6, 7. In addition thereto, the components 14 are also connected or interconnected with each other as well as to the traction energy storage devices 5, 6, 7 via the electric connector means 13. The electric connection or interconnection via the electric connector means 13 is shown only schematically in FIG. 1. The components 14 may for example comprise a charging device, a device for contactless energy transmission, a DC voltage converter, an electric heater, and/or an air condition compressor. The components 14 may be arranged in the underbody 9 of the motor vehicle or in a transmission tunnel (not shown) of motor vehicle 1, which may be connected in particular with the underbody 9 of the motor vehicle.

Figure 2:
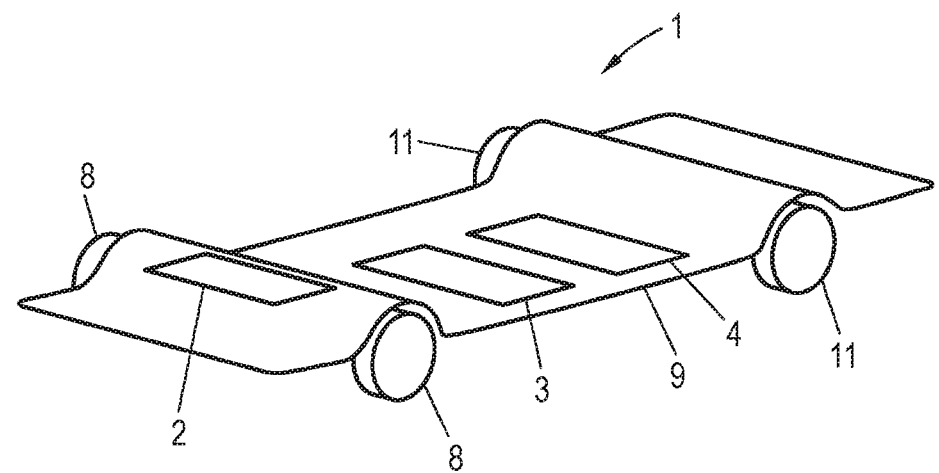
FIG. 2 a schematic representation of an underbody of a motor vehicle according to the invention, FIG. 3 a schematic representation of an underbody of a first model variant of a motor vehicle according to the invention, FIG. 4 a schematic representation of an underbody of a second model variant of a motor vehicle according to the invention, FIG. 5 a schematic representation of an underbody of a third model variant of a motor vehicle according to the invention, FIG. 6 elements arranged on a frame in a method according to the invention of a motor vehicle according to the invention.

FIG. 2 shows a schematic representation of an underbody 9 of a motor vehicle according to the invention. For reference purposes, FIG. 2 to FIG. 5 only show the underbody 9 of the motor vehicle (1), no interior or body of the motor vehicle are depicted. To clarify the orientation of the underbody 9 and the arrangement of the recesses 2, 3, 4, the front wheels 8 as well as the rear wheels 11 are schematically represented, respectively. The motor vehicle (1) comprises in the region between the front wheels 8 the front recess 2, as well as in the region between the front wheels 8 and the rear wheels 11 the middle recess 3 as well as the rear recess 4. In the motor vehicle shown in FIG. 2, no traction energy storage devices are inserted into the recesses 2, 3, 4.

Figure 3:
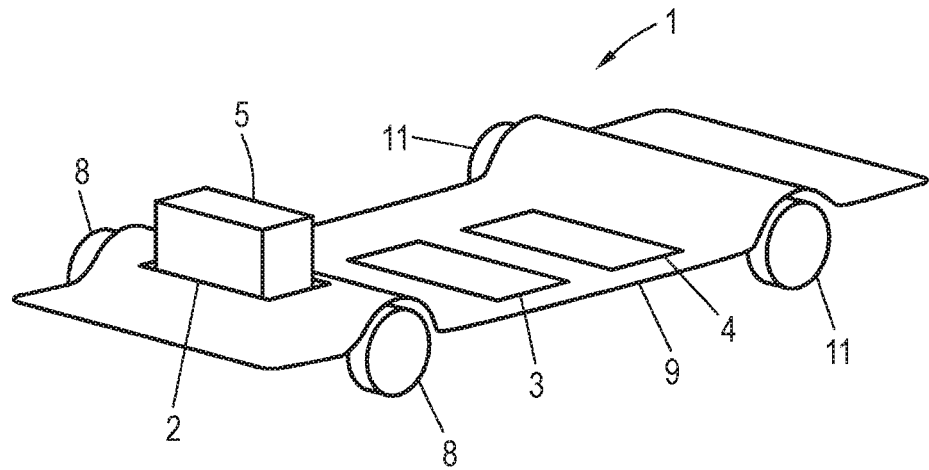

FIG. 3 shows a schematic representation of an underbody 9 of a first exemplary embodiment of a motor vehicle 1 according to the invention. The traction energy storage device 5 is inserted into the front recess (2). No traction energy storage devices are inserted into the middle recess 3 and the rear recess 4.

Figure 4:
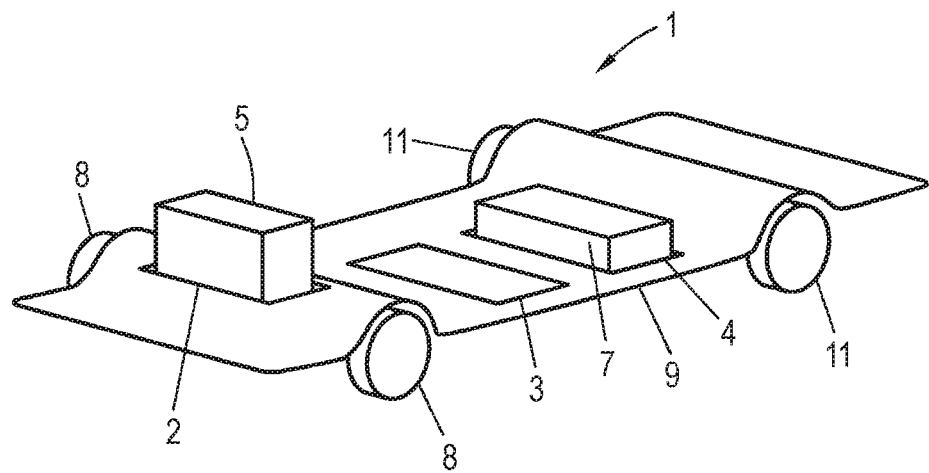

FIG. 4 shows a schematic representation of an underbody 9 of a second exemplary embodiment of a motor vehicle 1 according to the invention, in which additionally to the traction energy storage device 5 inserted into the front recess 2, the traction energy storage device 7 is inserted into the rear recess 4. The second exemplary embodiment of a motor vehicle 1 according to the invention shown in FIG. 4 has an overall higher capacity of the traction energy storage devices 5, 7, in comparison with the first exemplary embodiment depicted in FIG. 3, since in addition to the traction energy storage device 5 arranged in the front recess 2 in the exemplary embodiment shown in FIG. 4, the traction energy storage device 7 is inserted into the rear recess 4.

Figure 5:
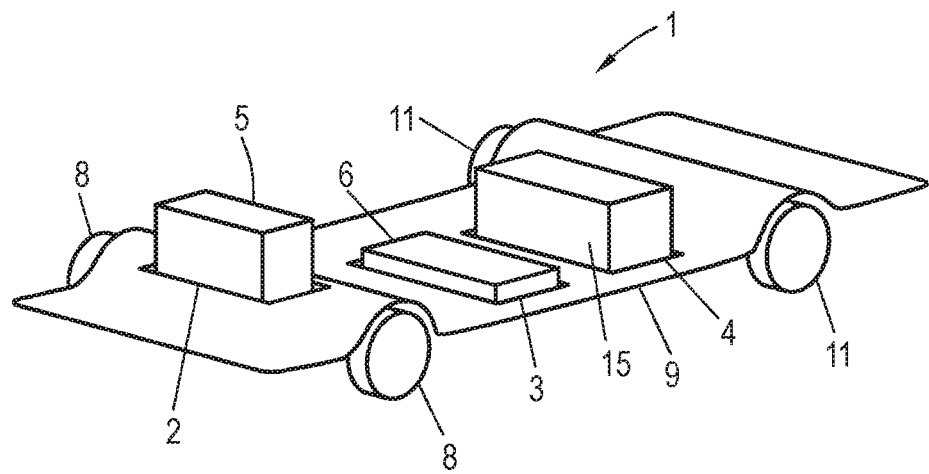

FIG. 5 shows a schematic representation of an underbody 9 of a third exemplary embodiment of a motor vehicle 1 according to the invention. The traction energy storage device 5 is arranged in the front recess 2, the traction energy storage device 6 is arranged in the middle recess 3, and the energy storage device 15 is arranged in the rear recess 4. The third exemplary embodiment depicted in FIG. 5 shows a higher capacity of the traction energy devices 5, 6, 15 than the second exemplary embodiment shown in FIG. 4, since in addition, the traction energy storage device 6 is provided in the middle recess 3 and the traction energy storage device 15 is inserted into the rear recess 4, which has a higher capacity than the traction energy storage device 7 inserted into the second exemplary embodiment. With increasing capacity of the inserted traction energy storage devices, electric machines with higher nominal power may be used and/or higher ranges of the motor vehicle 1 may be achieved. In all exemplary embodiments, arrangements of capacitors or batteries or accumulators may be used as traction energy storage devices.

Figure 6:
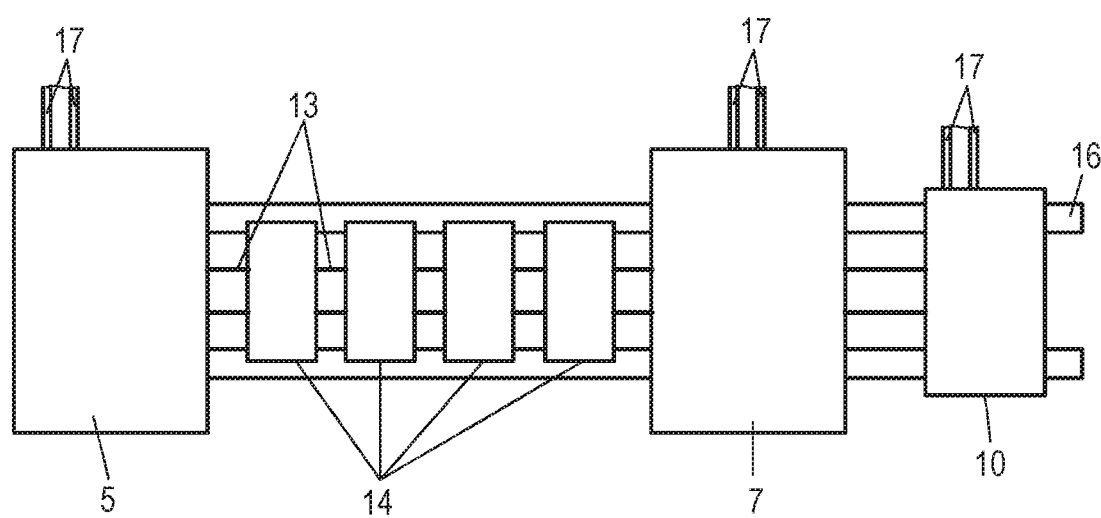

FIG. 6 shows a frame 16, on which according to a method according to the invention, the traction energy storage devices 5, 7, the electric machine 10, as well as the components 14 are arranged and electrically connected or interconnected with each other via the electric connector means 13. The traction energy storage devices 5, 7 as well as the electric machine 10 continue to be connected with coolant lines 17, via which they may be connected after assembly in a motor vehicle 1 to one or more coolant circuits of the motor vehicle. The arrangement on the frame 16 allows the elements of the electric drive shown to be prewired before assembly in the motor vehicle. Depending on the design of the underbody 9 of the motor vehicle provided, it can be installed from the underside or the top of the underbody. In particular, it is also possible for a different number of components 14 to be arranged and prewired on the frame 16 and for at least one charging socket 12 to be connected to a component 14 and/or one of the traction energy store devices 5, 7 and/or that in addition or as an alternative to the electric machine 10, the electric machine 18 is arranged on the frame 16 and prewired. Depending on the model or equipment variant of the motor vehicle, more traction energy storage devices and/or traction energy storage devices with larger or smaller capacities can also be arranged and prewired on the frame 16.

The invention claimed is:

1. A motor vehicle, comprising:
two front wheels and two rear wheels, and an electric drive that is operable via a traction energy storage device, wherein the motor vehicle has a front recess in a region between the front wheels for a traction energy storage device assigned to the front recess, and has a rear recess in a region between the front wheels and the rear wheels, arranged in an underbody of the motor vehicle, for a traction energy storage device assigned to the rear recess, wherein traction energy storage devices are insertable or inserted into the recesses, wherein a traction energy storage device is inserted into the front recess, the device being embodied as a removable energy storage device that is removable after opening a front cover of the vehicle, wherein, in the region between the front wheels and the rear wheels, arranged in a transmission tunnel and/or in the underbody of the motor vehicle, the vehicle has further components that can be electrically connected to one or more traction energy storage devices of the vehicle, the further components comprising at least one of a charging device, a contact-free energy transfer device, an electric heater, and an air conditioning compressor, and wherein the traction energy storage devices comprise coolant lines which are connectable to coolant lines of the motor vehicle when the traction energy storage devices are inserted into the motor vehicle.

2. The motor vehicle of claim 1, wherein in the region between the front wheels and the rear wheels, the motor vehicle has at least one middle recess, arranged in an underbody of the motor vehicle, for a traction energy storage device assigned to the middle recess, wherein a traction energy storage device is insertable or inserted into the middle recess.

3. The motor vehicle of claim 1, wherein the further components additionally comprise at least one DC voltage converter.

4. The motor vehicle of claim 1, wherein the electric drive of the motor vehicle comprises at least one electric machine arranged in a region of the rear wheels and/or at least one electric machine arranged in the region of the front wheels.

5. The motor vehicle of claim 1, wherein the motor vehicle has at least one charging socket, arranged in a region above one of the rear wheels.

6. A method for arranging at least one traction energy storage device in a motor vehicle, comprising the following steps:

providing an underbody, the at least one traction energy storage device, a frame, and/or an electric connector means, providing further components that can be connected with the at least one traction energy storage device, arranging the at least one traction energy storage device and the further components on a frame, connecting the traction energy storage device with the electric connector means, connecting the further components with the at least one traction energy storage device via the electric connector means, and arranging the frame on the underbody, wherein the further components comprise at least one of a charging device, a contact-free energy transfer device, an electric heater, and an air conditioning compressor, and wherein the motor vehicle is provided with coolant lines which are connectable to coolant lines of the at least one traction energy storage device when the at least one traction energy storage device is arranged with the frame on the underbody of the motor vehicle.

7. The method of claim 6, wherein at least one charging socket is provided for connecting with at least one component and/or with the at least one traction energy storage device via electric connector means.

8. The method of claim 6, wherein at least one electric machine is arranged on the frame and connected with the at least one traction energy storage device via the electric connector means and/or connected to the coolant lines of the motor vehicle.

* * * * *